May 27, 1958     B. WALKER     2,836,808
BATTERY TESTER
Filed April 11, 1955
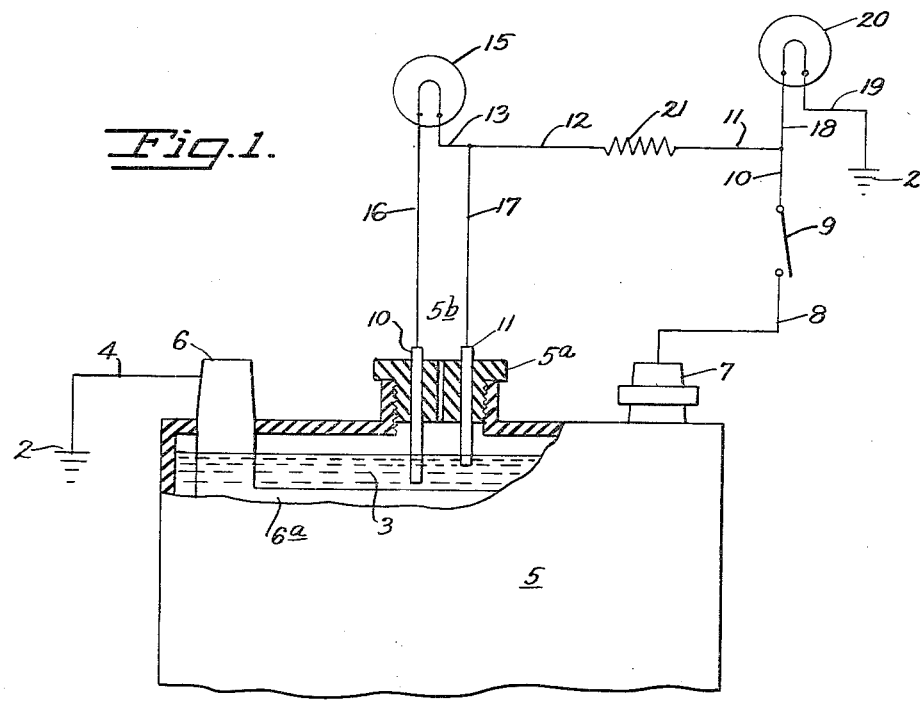
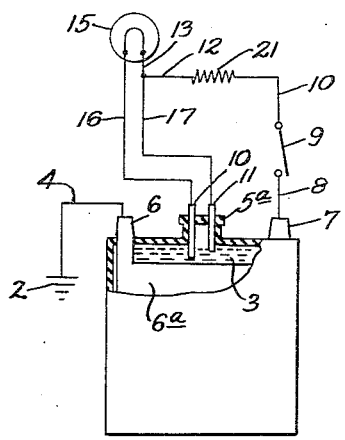
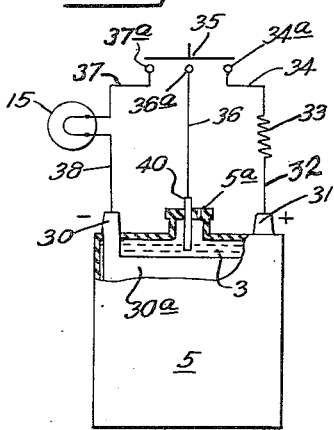
INVENTOR,
Brooks Walker

United States Patent Office 2,836,808
Patented May 27, 1958

2,836,808

BATTERY TESTER

Brooks Walker, Piedmont, Calif.

Application April 11, 1955, Serial No. 500,366

3 Claims. (Cl. 340—249)

This invention pertains to improvements in indicators for showing when the liquid in the battery or a container for a conductor liquid is below a predetermined level. There have been previous methods of indicating when the liquid in a battery is low which involve the use of a probe, such as the co-pending application entitled "Battery Tester" by Henry J. Schultz, application Ser. No. 477,815, assigned to me.

This invention, like the above-mentioned application, uses a switch which could be the starter switch, the stoplight switch or a separate manual switch. The stoplight circuit may also be used to dissipate the charge on the probe and provide a tester for the stoplight bulb as well as the battery level.

One form of the above-mentioned application uses a relay to cause the indicator light light when the battery level is low rather than have the indicator light light if the battery level is safe and not light if the battery needs attention because of low fluid level.

Because most vehicles today use indicator lights to light with a red glow to show when (a) the hand brake is left on (b) the oil pressure is low (c) the generator is not generating (as shown in the 1954 Cadillac Motor Car Service Manual, it is believed desirable to have the indicator light for the battery fluid level light when the battery level is low and not light when the level is satisfactory and above the bottom of the probe.

This invention accomplishes this desired purpose of having the indicator light light when the battery level is low by the use of a resistance sufficiently high to carry enough current to light the indicator light when the probe is out of the liquid but not light the indicator light when an alternate electric path is provided parallel with the indicator light to the probe and battery liquid.

Two different types of probes are used, one involving a double probe, one deeper than the other in the battery liquid connected across the indicator bulb and preferably inserted in the ground cell of the battery with lead probes and a suitable resistance in the line to the hot non-grounded battery terminal through a switch. This switch can be the starter or stoplight switch as stated before, or a manual switch. The indicator bulb will light when one of the two probes is above the liquid and not light when the liquid is high enough so that both probes are immersed, provided the switch is closed. If the stoplight switch is used, an afterglow of the indicator light indicates that the stoplight bulb filament and circuit is complete. If the indicator light goes out promptly when the switch is opened, it indicates that the stoplight or circuit is open.

Another circuit for accomplishing the same function of the indicator bulb is accomplished by a three pole shorting switch which can be in an integral unit with the indicator light and the resistance, so that only one line need be run from the unit to the battery probe on a vehicle and the other two terminals of the unit can be connected, one from the indicator light an $a$— connection and the other to $a+$ potential from the built-in resistance. Both of the latter are readily available near a vehicle dash board in case the invention is applied to a vehicle as an accessory, regardless whether the + or — of the battery is grounded. In this case the built-in three contact switch, indicator light, and resistance provides lighted bulb indication whenever the battery level is low, and the switch must be activated by any suitable means to get a battery level test.

Though this description has been applied to vehicle battteries, it can function as an indicator of a conductive liquid level by using an outside source of electrical potential and shorting out the bulb by probes forming a closed parallel circuit across the indicator light with current imput limited by the resistance in the circuit so that the indicator light will not light when shorted out by the probes immersed in the conductive liquid.

Other objects and advantages of the invention will become apparent from the accompanying specification and claims.

I have illustrated my invention in the accompanying drawings, in which:

Fig. 1 is a diagrammatic circuit and partly cut away end elevation of a battery to which the circuit is applied showing one form of the invention.

Fig. 2 is a diagrammatic circuit and partly cut away end elevation of a battery to which the circuit is applied showing another form of the invention.

Fig. 3 is a diagrammatic circuit and partly cut away end elevation of a battery to which the circuit is applied showing still another form of the invention.

On all figures like numerals of reference refer to corresponding parts.

In Fig. 1 I have shown a battery 5 of the wet cell type with one terminal connected to ground 2 by wire 4. Terminal 6 is connected to plate 6a in battery 5. Plate 6a is immersed in battery liquid 3 which is preferably always above the top of plate 6a. Battery 5 has a cap 5a with a vent 5b and two probes 10 and 11 preferably made of lead. Probe 10 extends a little deeper into the battery liquid than probe 11 which extends to a depth that is a minimum safe distance for the battery fluid 3 above the battery plates, such as 6a,, where more liquid should be added to the battery. The hot terminal 7 of the battery carries full battery potential between terminal 7 and ground 2.

The circuit that includes the indicator light 15 that shows when more liquid should be added to the battery includes line 8 going from terminal 7 to switch 9. Switch 9 may be a manual switch or the spotlight switch as shown in said application Ser. No. 477,815 or the starter switch. Stoplight 20 is connected to switch 9 by lines 10 and 18 and to ground 2 by line 19. Resistance 21 is connected to line 10 by line 11 and to indicator bulb 15 by line 12 and line 13. Line 12 is connected to probe 11 by line 17. The other side of bulb 15 is connected to probe 10 by line 16.

In operation, if stoplight switch 9 is closed and battery liquid 3 is above the bottom of probe 10 and probe 11, current will flow through lines 10 and 18 to stoplight 20, one terminal of which is grounded by line 19 so stoplight 20 will light. Current will also flow in limited quantity through line 11, resistance 21, lines 12, line 17, to probe 11, and a small amount of current insufficient to light bulb 15 will flow through line 13, the filament of bulb 15, line 16, to deeper probe 10 when the liquid is at the level shown or whenever the battery liquid 3 is normal and above the bottom of probe 11.

When the battery liquid 3 is below the bottom of probe 11, no current will flow through line 17 to probe 11, as probe 11 will be above the liquid 3. Enough current will flow through line 11, resistance 21, line 12, line 13, indicator light 15, line 16, probe 10 and battery fluid 3 to light the indicator light 15 showing that the liquid 3 is below probe 11 and needs to have more liquid added. During this lighting of indicator light 15 a deposit will be built up on probe 10. When switch 9 is opened, this deposit will be dissipated by a reverse flow from the deposit, probe 10, line 16, indicator bulb 15, line 13, line 12, resistance 21, line 11, line 18, stoplight 20, line 19, to ground 2 and ground 2 through line 4, terminal 6, plate 6a to liquid 3, to keep indicator light glowing for a few seconds until the deposit is dissipated. This afterglow of the indicator bulb acts as a test of the circuit and stoplight filament. If the circuit or stoplight filament is open the indicator light will go out immediately after the switch 9 is opened. By this circuit an indicator light 15 lights when the battery needs attention without the need of a relay. A test is also provided for another circuit at the same time.

As an example of one set of components that work in a 6-volt battery circuit, I have found that if resistance 21 is 65 ohms and indicator light 15 is #49, good results have been obtained; however, other components may work satisfactorily or equally well.

In Fig. 2, I have shown another circuit in which no stoplight is involved. Switch 9 can be manual or a switch like the starter switch on a vehicle. If the liquid 3 is above the bottom of probes 10 and 11, a limited flow of current will flow from terminal 7, line 8, switch 9, line 10, high resistance 21, line 12, line 17, probe 11 to battery liquid 3, plate 6a, terminal 6, line 4 to ground 2, and a smaller amount of current will flow through line 13, indicator light 15, line 16, to probe 10, but this current will be insufficient to light indicator light 15. Resistance 21 is of such a value that the drain on the battery when the liquid 3 is above probe 11 that the current flow will be about equal to the current flow through one or two dash indicator lights which is not objectionable.

When the battery liquid is below probe 11, current flows from hot terminal 7, line 8, switch 9 (when closed), line 10, resistance 21, lines 12 and 13, indicator light 15, line 16, probe 10, to liquid 3, and no current flows through line 17 to probe 11 which is above liquid 3 and therefore is an open circuit, so that indicator light 15 lights as long as switch 9 is closed and the liquid 3 is below probe 11. This is a simple circuit which does not require a relay as shown in said pending application, Ser. No. 477,815.

Fig. 3 shows another circuit which can be used with the probe 40 in a cell containing either the + or − exterior terminal. As shown, probe 40 is in the same cell as terminal 30 and plates 30a and extends to a depth where more liquid should be added when the fluid 3 is below the bottom of probe 40. A three-contact shorting switch 35 makes simultaneous contact with contacts 37a, 36a, and 34a.

When the liquid 3 is above the bottom of probe 40 current flows from + terminal 31 through line 32, resistance 33, line 34, contact 34a, switch 35, terminal 36a, line 36, probe 40, to the liquid 3 in the cell with negative plates 30a, which are connected to negative terminal 30. Switch 35 also connects terminals 34a, 36a, and 37a all to each other. Terminal 33 is connected to line 38, indicator light 15, line 37, to terminal 37a. Because of the resistance 33, insufficient current will flow from switch 35 to light indicator light 15 when current is flowing through line 36 to probe 40 when probe 40 is partially immersed in liquid 3. When liquid 3 is below probe 40, no circuit will flow in line 36 to probe 40, as it will be an open circuit with probe 40 above liquid 3 and resistance 33 will pass enough battery potential to light indicator light 15 when switch 35 is closed to indicate that the battery liquid needs replenishing.

The main advantage of this circuit is that a unit can be made up of indicator light 15, switch 35, line 37, terminal 37a, terminal 36a, terminal 34a, line 34, and resistance 33. Such a unit can be mounted on or under the instrument panel with indicator light connected to a negative potential near the instrument panel. Terminal 36a is connected to probe 40 in the negative cell by new line 36 and resistance 33 is connected to a positive potential near the instrument panel. This provides a unit that can be mounted on the instrument panel with a manual switch for testing the height of the battery level with only one new connection necessary from the unit to probe in the negative battery cell. No battery drain by the tester is possible unless switch 35 is closed. Battery probe 40 can be inserted in one of the original battery caps or in a replacement cap. The probe can be lead or other suitable material.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A wet battery, multiple cells in said battery, a negative battery terminal, a positive battery terminal, an indicator element, a probe, said probe being in said negative cell, a resistance, a three pole switch, one switch pole connecting a circuit to said negative pole through said indicator, a second switch pole connecting to said probe in the cell with the said negative terminal, the third switch terminal connected to the said positive terminal through said resistance when said three pole switch is open, when said three pole switch is closed each of said poles being electrically connected to provide an indication when said probe is above the liquid in the cell containing said probe regardless of which battery terminal is grounded.

2. A wet multiple cell battery, a positive battery terminal, a negative battery terminal, an indicator, a resistance, a probe, said probe being in the same cell with said negative terminal, said probe extending to the depth of the liquid in said cell with the negative terminal when more liquid should be added, a switch, said switch connecting said negative terminal to said positive terminal through said indicator with said probe in a circuit across said indicator and connected to said negative terminal by said liquid in the cell with said negative terminal when said liquid is above the bottom of said probe, said indicator operated on battery potential, said indicator operating when said liquid is below said probe and said switch is closed but not operating when said switch is closed and said probe is in said liquid.

3. A battery, liquid in said battery, a positive pole on said battery, a negative pole on said battery, a three-contact shorting switch, a probe, said probe connected to one of said switch contacts contacting said liquid when it is at normal height in said battery and not contacting said liquid when said liquid is low in said battery, an indicator connected to another of said contacts on said switch and to said negative battery pole, said probe being in the same liquid as the said negative pole, a resistance, said resistance connected between the remaining contact of said switch and said positive pole of said battery, said indicator operating on the current passed through said switch and said resistance if said probe is above said liquid in said battery, said indicator not indicating when said switch is closed if said liquid is above the bottom of said probe as insufficient current will flow through said resistance, said three contacts being independent of each other and not electrically connected when said switch is open.

References Cited in the file of this patent

UNITED STATES PATENTS

| | | |
|---|---|---|
| 1,753,381 | Levings | Apr. 8, 1930 |
| 2,159,531 | Polin | May 23, 1939 |